(12) United States Patent
Takei

(10) Patent No.: US 8,957,899 B2
(45) Date of Patent: Feb. 17, 2015

(54) IMAGE PROCESSING APPARATUS AND METHOD FOR CONTROLLING THE SAME

(75) Inventor: Hirofumi Takei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 12/848,546

(22) Filed: Aug. 2, 2010

(65) Prior Publication Data

US 2011/0032268 A1 Feb. 10, 2011

(30) Foreign Application Priority Data

Aug. 4, 2009 (JP) ................................. 2009-181834

(51) Int. Cl.
- *G09G 5/02* (2006.01)
- *G06T 13/00* (2011.01)
- *G06T 13/80* (2011.01)
- *H04N 1/00* (2006.01)
- *G06F 3/147* (2006.01)

(52) U.S. Cl.
CPC ............ *G06T 13/80* (2013.01); *H04N 1/00198* (2013.01); *H04N 1/0035* (2013.01); *H04N 1/00442* (2013.01); *G06F 3/147* (2013.01); *G09G 2360/144* (2013.01); *G09G 2360/16* (2013.01); *G09G 2380/16* (2013.01)
USPC ............................ 345/473; 345/589; 345/475

(58) Field of Classification Search
CPC combination set(s) only.
See application file for complete search history.

(56) References Cited

U.S. PATENT DOCUMENTS

| | | | |
|---|---|---|---|
| 2005/0062888 A1* | 3/2005 | Wood et al. .................... | 348/553 |
| 2006/0284810 A1 | 12/2006 | Aratani et al. | |
| 2008/0002910 A1* | 1/2008 | Ojima et al. ................... | 382/277 |
| 2008/0298705 A1* | 12/2008 | Jeong ............................. | 382/254 |

FOREIGN PATENT DOCUMENTS

| | | |
|---|---|---|
| JP | 07-175464 | 7/1995 |
| JP | 2006-350647 | 12/2006 |

* cited by examiner

*Primary Examiner* — Ulka Chauhan
*Assistant Examiner* — Schiller Hill
(74) *Attorney, Agent, or Firm* — Cowan, Liebowitz & Latman, P.C.

(57) ABSTRACT

The present invention includes an image processing apparatus having a slide show function of displaying a plurality of images while sequentially automatically switching the images and including an adding unit which adds a transition effect at the time of switching display from a first image to a second image, an obtaining unit which obtains characteristic values indicative of luminance of the first and second images, and a control unit which controls the adding unit to add a transition effect when the difference between the characteristic value of the first image and the characteristic value of the second image is equal to or larger than a predetermined threshold.

14 Claims, 10 Drawing Sheets

IMAGE PROCESSING APPARATUS AND METHOD FOR CONTROLLING THE SAME

BACKGROUND OF THE INVENTION

1. Field of the Invention

The present invention relates to an image processing apparatus for continuously displaying a plurality of images while sequentially switching them and a method for controlling the same. More particularly, the invention relates to an image processing apparatus for adding a transition effect to switching of images and a method for controlling the same.

2. Description of the Related Art

An image display method called a slide show of continuously displaying a plurality of images while sequentially switching them is known. Japanese Patent Application Laid-Open No. 2006-350647 discloses an image display method for adding a special effect at the time of switching of images in a slide show, in which a plurality of feature regions are detected from an image and the special effect is determined based on a result of the detection.

Japanese Patent Application Laid-Open No. 7-175464 discloses a technique of changing a screen gradually from a screen before a change to a final display screen at the time of changing display of a display device.

SUMMARY OF THE INVENTION

When switching is performed between two images whose visual characteristic values such as luminance or hue are largely different from each other, there is a possibility that a viewer feels a strong visual stimulus at the time of image switching. In the image display method described in Japanese Patent Application Laid-Open No. 2006-350647, the difference between characteristic values of two images which are switched is not considered in determination of a special effect at the time of image switching. Consequently, when the characteristic values of two images to be switched are large, there is a possibility that it cannot preferably suppress that a viewer feels a strong visual stimulus at the time of image switching.

In the display method of the display device described in Japanese Patent Application Laid-Open No. 07-175464, a gradual screen drawing is always performed a plurality of times at the time of changing the screen. Consequently, the method has a problem that it takes time to display an image with original luminance. Due to the problem, continuous switching display of a plurality of images cannot be performed lightly, and there is a possibility that comfortable image viewing experience with a high degree of satisfaction cannot be provided.

The present invention has been achieved in consideration of the problems and an object of the invention is to provide an image processing apparatus which suppresses a strong visual stimulus to a viewer at the time of switching of images in successive display of a plurality of images and does not require unnecessarily long time for the image switching display and a method of controlling the apparatus.

This invention employs a construction as follows.

An image processing apparatus having a slide show function of displaying a plurality of images on a display unit while sequentially automatically switching the images, comprising:

an adding unit, at the time of switching display from a first image being displayed on the display unit to a second image to be displayed next to the first image, of adding a transition effect so that the second image is displayed gradually from the first image being displayed;

an obtaining unit which obtains characteristic values indicative of luminance of the first and second images displayed on the display unit; and a control unit which controls the adding unit so that, when the difference between the characteristic value of the first image and the characteristic value of the second image obtained by the obtaining unit is equal to or larger than a predetermined transition effect threshold, the transition effect that the second image is displayed gradually from the first image is added at the time of switching display from the first image to the second image.

This invention also employs a construction as follows.

A method for controlling an image processing apparatus having a slide show function of displaying a plurality of images on a display unit while sequentially automatically switching the images, comprising:

an adding step, at the time of switching display from a first image being displayed on the display unit to a second image to be displayed next to the first image, of adding a transition effect so that the second image is displayed gradually from the first image being displayed;

an obtaining step of obtaining characteristic values indicative of luminance of the first and second images displayed on the display unit; and a control step of controlling the adding step so that, when the difference between the characteristic value of the first image and the characteristic value of the second image obtained in the obtaining step is equal to or larger than a predetermined transition effect threshold, the transition effect that the second image is displayed gradually from the first image is added at the time of switching display from the first image to the second image.

According to the present invention, in successive display of a plurality of images, a strong visual stimulus to a viewer is suppressed at the time of switching of images, and unnecessarily long time is not required for the image switching display.

Further features of the present invention will become apparent from the following description of exemplary embodiments with reference to the attached drawings.

DESCRIPTION OF THE EMBODIMENTS

Embodiments of the present invention will be described in detail below with reference to the appended drawings.

First Embodiment

Figure 1:
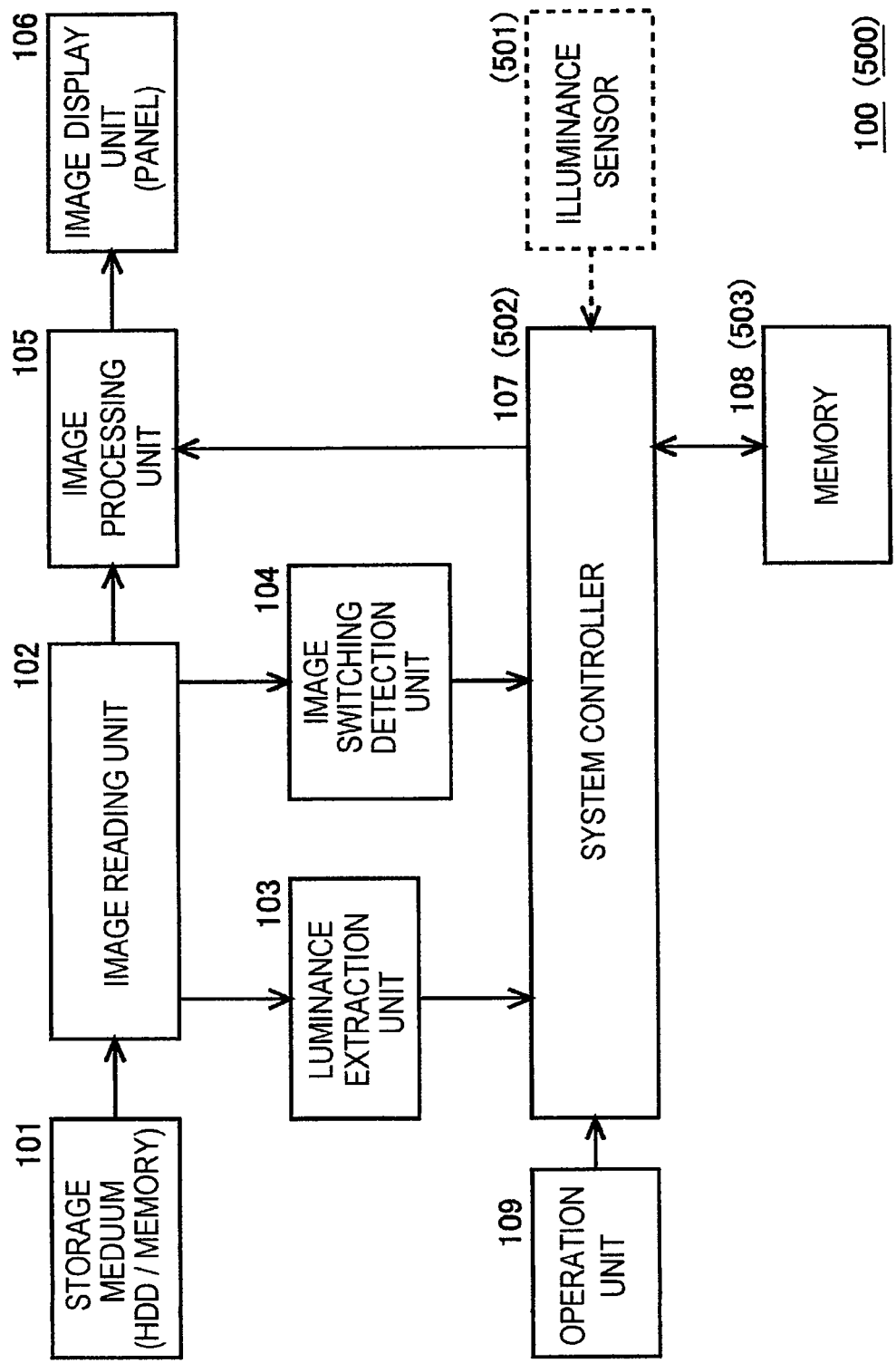
FIG. 1 is a block diagram showing an image display apparatus of a first embodiment.

FIG. 1 is a block diagram showing the configuration of an image display apparatus 100 according to a first embodiment of the invention. The image display apparatus 100 is an apparatus for continuously displaying a plurality of images while sequentially switching them by an operation of a viewer and/or an automatic process. The image display apparatus 100 may be used for, for example, continuously displaying captured pictures one by one on a monitor screen of a digital camera or continuously displaying images one by one stored in a digital television or a portable player on a monitor screen of the device.

In FIG. 1, images such as a still image and a moving image are stored in a storage medium 101 which is a hard disk, a memory, or the like. An image reading unit 102 reads the image stored in the storage medium 101 and outputs it to an image processing unit 105. When the image stored in the storage medium 101 is compressed, the image reading unit 102 performs a decompression process and outputs a baseband image to the image processing unit 105. A luminance extraction unit 103 extracts average picture level (hereinbelow, also called "APL") of the image read by the image reading unit 102 and outputs it as luminance of the image to a system controller 107 which will be described below. In the embodiment, the average picture level APL corresponds to a "characteristic value indicative of luminance of an image" in the present invention, and a luminance extraction unit 103 for extracting the average picture level APL from an image corresponds to an "obtaining unit" in the invention. An image switching detection unit 104 detects a timing when the image reading unit 102 finishes reading of a new image (an image to be displayed next) and a display image can be switched, and outputs an image switching detection signal to the system controller 107. The image processing unit 105 executes various image processes such as zooming, wiping, cross-fade, and scrolling, in addition to a luminance process and a color process on an input baseband image. An image display unit 106 is an LCD panel or the like for displaying a display image subjected to the various image processes which is output from the image processing unit 105. The system controller 107 controls the blocks forming the image display apparatus 100 in a centralized manner and has therein a microcomputer and the like. A memory 108 is a memory for storing program data, various thresholds to be described below, luminance of an image presently being displayed on the image display unit 106, and the like. An operation unit 109 with which the user enters various instructions such as execution of image reproduction and display to the image display apparatus 100. In FIG. 1, reference numerals 500 to 503 in parentheses and an illuminance sensor 501 drawn by a broken line are components related to an image display apparatus 500 according to a second embodiment which will be described below and are not related to the image display apparatus 100 of the first embodiment.

(Description on Image Displaying Operation of Image Display Apparatus 100)

Figure 2:
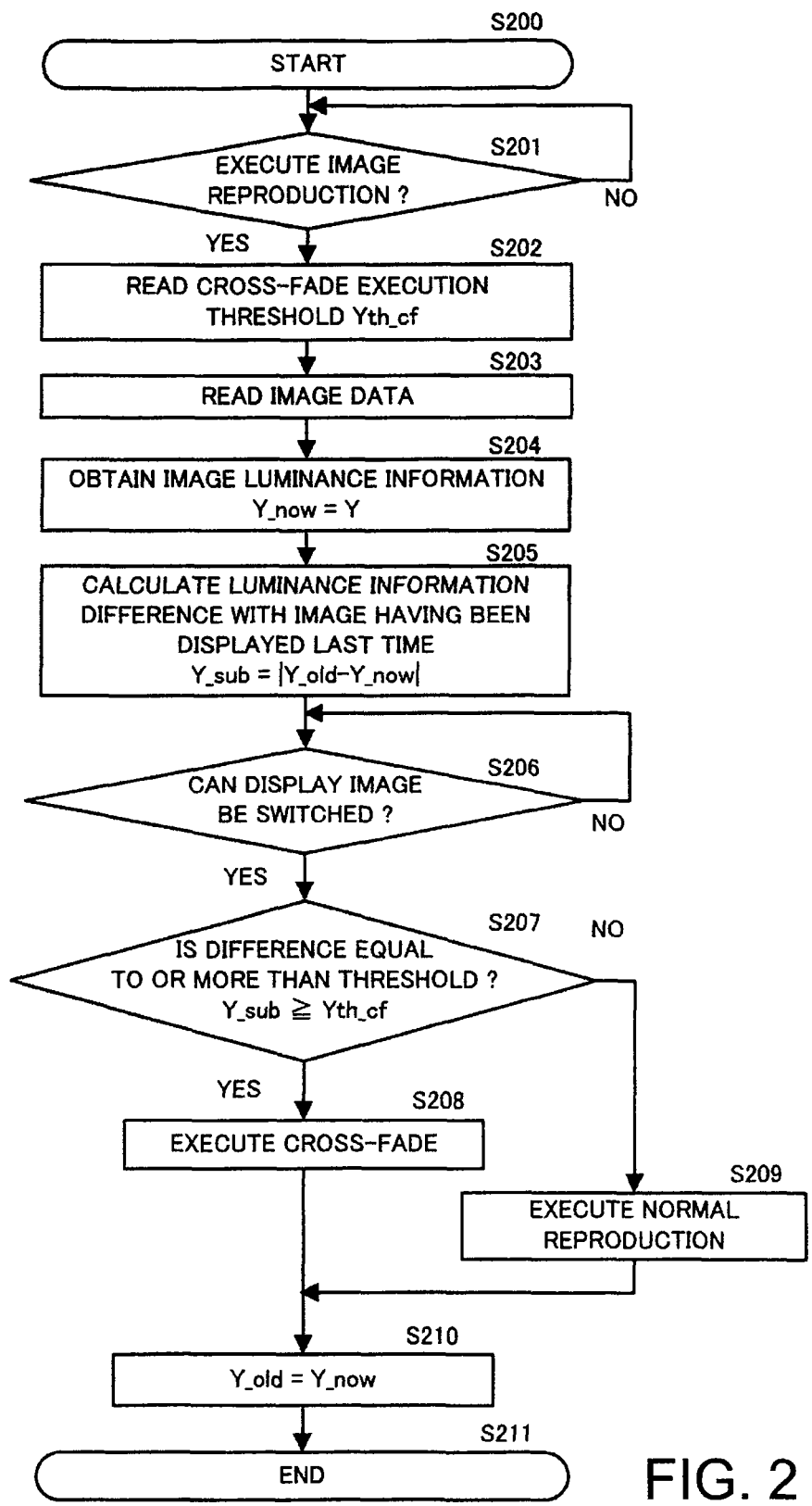
FIG. 2 is a flowchart showing the operations of a system controller in the first embodiment.

Next, the operation of the image display apparatus 100 according to the invention will be described using the flowchart of FIG. 2. The flowchart of FIG. 2 is executed by controlling the blocks by the system controller 107 in FIG. 1.

First, when execution of image reproduction is instructed by an operation from the operation unit 109 in a process of step S201, the system controller 107 moves to process in step S202 and reads a cross-fade execution threshold Yth_cf. The cross-fade execution threshold Yth_cf is a reference value for determining whether addition of the cross-fade effect to be described below is executed. The cross-fade execution threshold Yth_cf is stored in the memory 108 in FIG. 1.

The cross-fade execution threshold Yth_cf will now be described. When switching of two images having a large luminance difference is performed immediately, there is a possibility that a viewer feels a strong visual stimulus and it causes fatigue of the eyes or loss of a comfortable image viewing experience. The cross-fade execution threshold Yth_cf is determined based on the upper limit value of the luminance difference of two images, which does not make the viewer feel a strong visual stimulus even if switching between the two images is performed immediately. The value with which the luminance difference between two images does not make the viewer feel a strong visual stimulus also depends on the conditions of the viewer. There may be a case that it is difficult to determine a reference value satisfying the conditions of all of viewers. In such a case, the cross-fade execution threshold Yth-cf may be determined statistically and experimentally.

The system controller 107 moves to the process in step S203 and performs a process of reading an image from the storage medium 101.

The system controller 107 moves to the process in step S204, receives the image read in step S203 and obtains the average picture level Y of the image extracted by the luminance extraction unit 103, as image luminance information. The obtained average picture level Y is stored as a luminance Y_now of an image to be displayed next.

The system controller 107 moves to the process in step S205, calculates the absolute value |Y_old−Y_now| of the difference between the luminance Y_now obtained in step S204 and luminance Y_old (luminance obtained at the time of execution of the flow of last time) of an image presently displayed, and sets it as luminance difference Y_sub. The luminance difference Y_sub corresponds to the difference between the characteristic value of a first image and the characteristic value of a second image in the present invention, and the system controller 107 executing the process in step S205 is a part of a "control unit" in the present invention.

The system controller 107 moves to the process in step S206 and performs a process of determining whether the displayed image becomes switchable based on an image switching detection signal from the image switching detection unit 104. When the displayed image becomes switchable, the system controller 107 moves to the process in step S207.

In the process in step S207, the luminance difference Y_sub and the cross-fade execution threshold Yth_cf are compared. When it is determined in step S207 that the luminance difference Y_sub is equal to or larger than the cross-fade execution threshold Yth_cf (YES in step S207), the system controller 107 moves to the process in step S208 and executes cross-fade. That is, the system controller 107 outputs a control signal causing to execute the cross-fade to the image processing unit 105. Determination of whether the luminance difference Y_sub in the embodiment is equal to or larger than the cross-fade execution threshold Yth_cf corresponds to determination of whether the characteristic value difference is equal to or larger than a transition effect threshold.

The cross-fade will now be described. In the case of displaying a new image B in place of an image A which is being displayed, the cross-fade denotes a transition effect of gradually changing a displayed image from the image A to the image B by combining the images A and B with weights and changing the weights with time. The cross-fade in the embodiment is an example of the transition effect of the present invention.

When the cross-fade is added to the switching from the image A to the image B, a period of displaying an image to which the cross-fade is added is inserted between a state where only the image A is displayed on the image display unit 106 and a state where only the image B is displayed. In the following, the period will be called a cross-fade period. In the cross-fade period, an image obtained by combining two images with weights which gradually change is displayed on the image display unit 106. Therefore, the luminance of the display image in the cross-fade period gradually changes with the time change of the weight. Consequently, by adding the cross-fade, a change in the luminance in the display image at the time of switching of the images may be made milder than that in the luminance in the display image when the cross-fade is not added. The longer the cross-fade period is, the milder a change in luminance of an image to which the cross-fade is added becomes.

In the embodiment, the cross-fade whose parameters such as the cross-fade period and weighting of synthesis are determined so that a luminance change rate becomes equal to or less than a predetermined second threshold is added to switching of images. The second threshold is determined based on the luminance change rate at which the viewer does not feel strong visual stimulus when the luminance of a display image changes almost continuously. Like in the case of determining the cross-fade execution threshold $Yth\_cf$, since the luminance change rate at which the viewer does not feel strong visual stimulus partly depends on the viewer, there is also a case that it is difficult to obtain a second threshold satisfying conditions on all of viewers. In such a case, the second threshold may be determined statistically or experimentally.

The cross-fade may be any cross-fade as long as the luminance change rate is equal to or less than the second threshold. For example, cross-fade with constant luminance change rate or cross-fade with constant cross-fade period may be used. In the case of the cross-fade with constant luminance change rate, the larger the luminance difference between two images is, the longer the cross-fade period is. In the case of the cross-fade with constant cross-fade period, it is sufficient to set the cross-fade period so that the luminance change rate is equal to or less than the second threshold even when the luminance difference of two images is the assumable maximum value. In this case, the larger the luminance difference of two images is, the higher the luminance change rate is. However, the luminance change rate does not exceed the second threshold, so that it can be preferably suppressed that the viewer feels strong visual stimulus. The cross-fade period in the embodiment corresponds to a transition period in the present invention. In the embodiment, insertion of the period of displaying an image to which the cross-fade is added between the state where only the image A is displayed and the state where only the image B is displayed corresponds to gradual transition of displaying the first image to the second image in the present invention.

In the embodiment, the cross-fade satisfying the above-described conditions is determined in advance, and whether the cross-fade is executed may be determined according to the luminance difference of two images. Alternately, the parameters of the cross-fade may be varied according to the level of the luminance difference between two images or according to the sign (positive or negative) of the difference of the luminance.

When switching between two images is performed instantaneously or in short time in a step functional manner without accompanying the transition effect such as cross-fade, the value of the luminance change rate itself becomes a very large value. However, when the luminance difference between two images is less than the cross-fade execution threshold $Yth\_cf$, there is a tendency that the viewer does not feel a strong visual stimulus much. That is, when the luminance difference between two images is less than the cross-fade execution threshold $Yth\_cf$, the second threshold does not become the boundary between presence and absence of a visual stimulus to the viewer.

As described above, in the embodiment, at least one of the following two conditions is satisfied so as not to give a strong visual stimulus to a viewer. More specifically, first, when changes in the display luminance at the time of switching between images is discontinuous (in a step functional manner), the luminance change rate is less than the cross-fade execution threshold $Yth\_cf$; and second, when luminance continuously changes, the luminance change rate is equal to or less than the second threshold.

Referring again to the flowchart of FIG. 2, when it is determined in step S207 that the luminance difference $Y\_sub$ is less than the cross-fade execution threshold $Yth\_cf$ (No in step S207), the system controller 107 moves to the process in step S209 and executes normal reproduction. That is, the system controller 107 outputs a control signal of simply replacing a display image to the image processing unit 105. The simple replacement of a display image is a process, in the case of displaying a new image B in place of an image A having been displayed, of switching the image A to the image B instantaneously or in very short time. The system controller 107 which determines whether the cross-fade has to be executed based on the result of comparison between the luminance difference $Y\_sub$ and the cross-fade execution threshold $Yth\_cf$ in step S207 and outputs an instruction of the image process to the image processing unit 105 corresponds to the "control unit" in the present invention. The image processing unit 105 which performs the process in step S208 or S209 according to an instruction from the system controller 107 corresponds to an "adding unit" in the present invention.

After completion of the process in step S208 or S209, the system controller 107 moves to the process in step S210. In step S210, luminance $Y\_now$ of the image being presently displayed (the image newly read in step S203) is stored as luminance $Y\_old$ in the memory 108 and the display process is finished in step S211.

On execution of the control flow for the first time, that is, at the time of displaying the first image, the luminance $Y\_old$ of the image displayed last time is not stored in the memory 108 yet. Therefore, in this case, calculation of the luminance difference $Y\_sub$ and comparison with the cross-fade execution threshold $Yth\_cf$ are skipped, and a process of simply displaying the image read in step S203 on the image display unit 106 is performed. The luminance $Y\_old$ of the first image displayed is stored in the memory 108.

On execution of the control flow of the second time and subsequent times, that is, at the time of switching to the second or subsequent image, the luminance of the image being presently displayed is stored as $Y\_old$. Therefore, in this case, from the luminance $Y\_now$ of an image to be newly read (an image to be displayed next) and the luminance $Y\_old$ of the image displayed last time, the luminance difference Y_sub at the time of switching of images can be calculated.
(Description of Concrete Display Example)

Figure 3C:
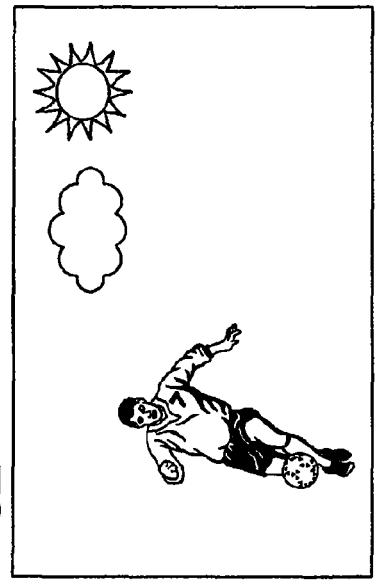
FIGS. 3A to 3D are diagrams showing input image examples of the first embodiment.
Figure 3D:
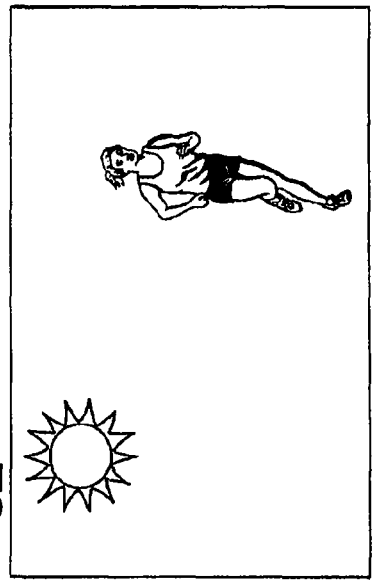
Figure 3A:
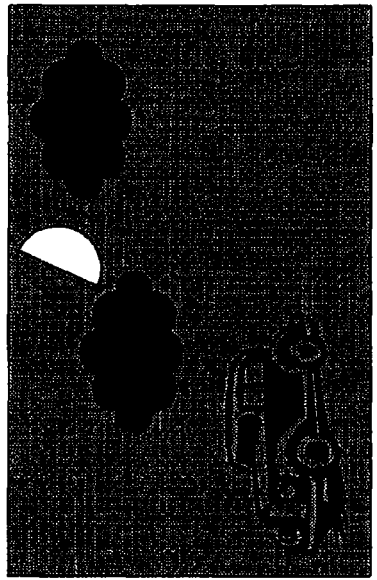
Figure 3B:
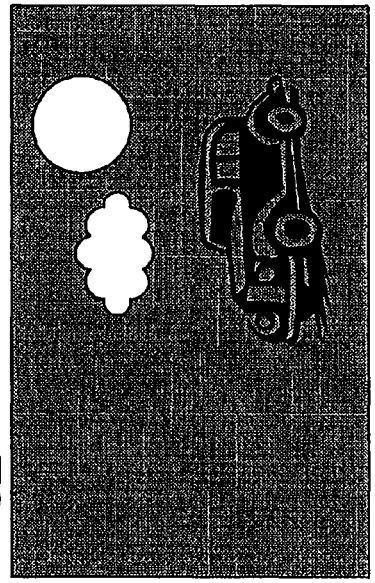

A concrete example of the case of displaying an image according to the flow of FIG. 2 will now be described. FIGS. 3A to 3D are examples showing images stored in the storage medium 101. The case of sequentially displaying images selected by the viewer is assumed here not a slide show or reproduction of a play list in which images are sequentially automatically switched. As shown in FIG. 3A, an image img_301 is generally dark, and the average picture level APL is "10". As shown in FIG. 3B, an image img_302 is generally bright, and the average picture level APL is "70". As shown in FIG. 3C, an image img_303 is also generally bright, and the average picture level APL is "75". As shown in FIG. 3D, an image img_304 is generally dark, and the average picture level APL is "15". It is assumed that the average picture level APL has a value from "0" to "100". The value of the average picture level APL is extracted from each image by the luminance extraction unit 103 each time an image is read, and output as luminance of the image to the system controller 107. To simplify the description of the operations, the operation after the image img_301 has been read and displayed on the image display unit 106 will be described.

After displaying of the image img_301, when switching to the next image img_302 is instructed in the operation in step S201, the cross-fade execution threshold Yth_cf for determining whether execution of the cross-fade is necessary is read in the process in step S202. In the embodiment, description will be given on assumption that the cross-fade execution threshold Yth_cf is 30. Next, in the process in step S203, the image img_302 is read. In the process in step S204, the average picture level APL of the image img_302 is extracted and stored as luminance Y_now of the image having been read this time (the image to be displayed next time). Since the average picture level APL of the image img_302 is "70" as described above, Y_now becomes 70. In the process in step S205, the luminance difference Y_sub between the image read last time (the image presently being displayed) and the image read this time (the image displayed next time) is calculated. Since the average picture level APL of the image img_301 which was read last time is 10, the luminance Y_old of the image read last time is 10. The luminance difference information Y_sub is calculated by Formula 1 from the luminance Y_old of the image read last time and the luminance Y_now of the image read this time.

$$Y\_sub = |Y\_old - Y\_now| \qquad \text{Formula 1}$$

Therefore, the luminance difference Y_sub of the images img_301 and img_302 is |10−70|=60.

When it is determined, in the process of step S206 that the image can be switched to the image img_302, the system controller 107 moves to step S207 and compares the luminance difference Y_sub with the cross-fade execution threshold Yth_cf. In this case, Y_sub is 60 and Yth_cf is 30 and Y_sub≥Yth_cf is satisfied, so that the system controller 107 moves to step S208. In the process in step S208, cross-fade is added as a transition effect to the switching from the image img_301 to the image img_302. As a result, the image displayed on the image display unit 106 changes from the image img_301 to the image img_302 after the cross-fade period. The luminance difference between the images img_301 and img_302 has a magnitude at which a strong visual stimulus may be given to a viewer if switching between the two images is performed promptly. However, by inserting the cross-fade period, the luminance change rate of the displayed image becomes milder. Therefore, a strong visual stimulus to a viewer can be suppressed.

The value "70" of the luminance Y_now of the image being presently displayed is stored as the luminance Y_old of the image which has been read last time in step S210 and the process is finished. Hereinafter, also at the switching to the next images img_303 and img_304, the above-described flow is repeated.

When the switching from the image img_302 to the image img_303 is instructed, the image img_303 is read, and the program moves to the process of step S205, Y_old=70 and Y_now=75. As a result, Y_sub becomes 5. Therefore, Y_sub≥Yth_cf is not satisfied. The program moves to step 209 as a result of the comparison in step S207, and the normal reproduction is executed. That is the image img_302 is promptly switched to the image img_303 and the transition effect is not added.

When the switching from the image img_303 to the image img_304 is instructed, the image img_304 is read, and the program moves to the process of step S205, Y_old is 75 and Y_now is 15. As a result, Y_sub becomes 60. Therefore, Y_sub Yth_cf is satisfied. The program moves to step S208 as a result of the comparison in step S207, and the image process of adding the cross-fade to the switching from the image img_303 to the image img_304 is executed.

Figure 4:
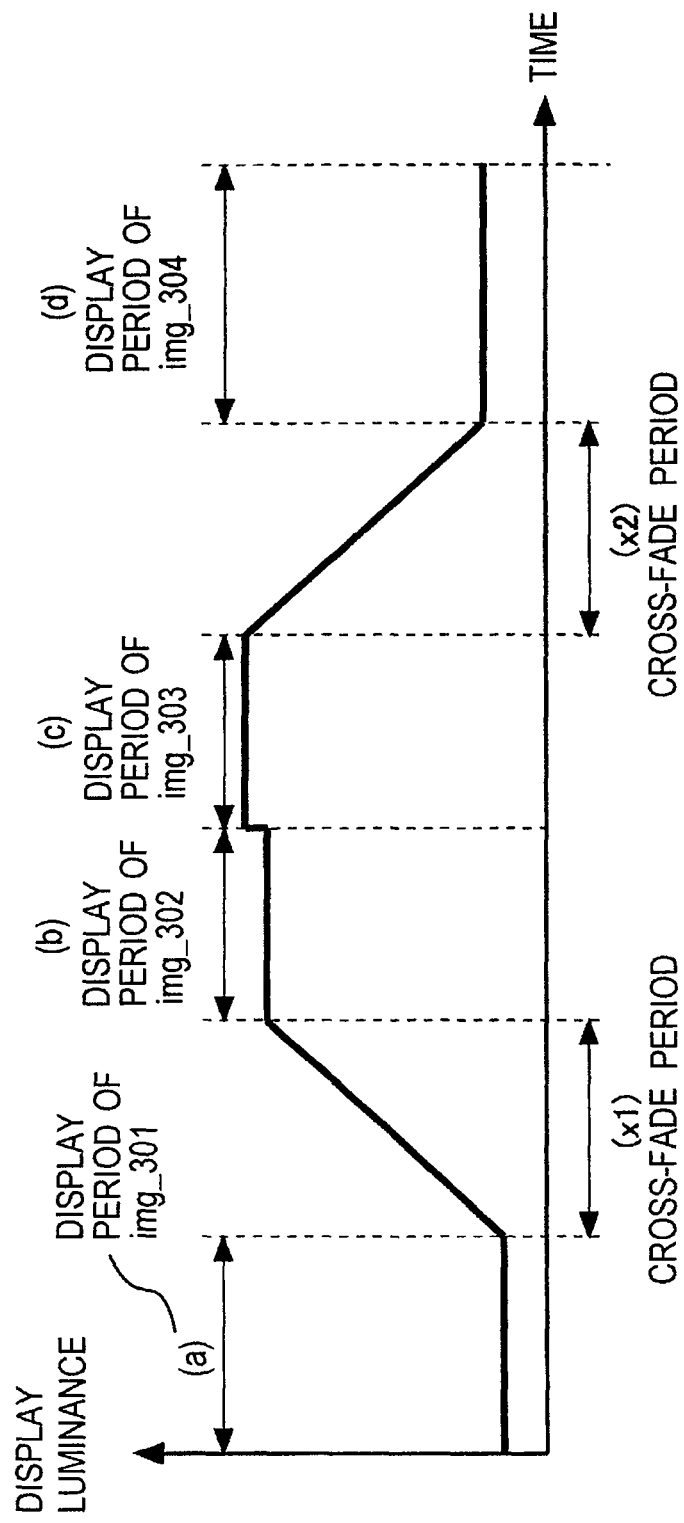
FIG. 4 is a diagram showing changes in image display luminance of the first embodiment.

FIG. 4 is a diagram showing the relations between lapse time and changes in display luminance of the case of performing switching display of a plurality of images by the transition effect control. Alphabets (a) to (d) in FIG. 4 indicate periods of displaying only the images img_301 to img_304, respectively, on the image display unit 106. Reference numerals (x1) and (x2) in FIG. 4 indicate the cross-fade period inserted at the time of switching from the image img_301 to the image img_302 and the cross-fade period inserted at the time of switching from the image img_303 to the image img_304, respectively. The solid line of FIG. 4 shows changes in the display luminance in each of the periods. As described above, at the time of switching from the image img_301 to the image img_302, the image process of cross-fade is performed. That is, the cross-fade period (x1) is inserted between the display period (a) of the image img_301 and the display period (b) of the image img_302. In the cross-fade period (x1), the images img_301 and img_302 are combined with a weight which changes gradually, and the composite image is displayed. Therefore, the display luminance of the image obtained by combining the two images and displayed, that is, the image to which the cross-fade effect is added gradually increases as shown by the solid line in the cross-fade period (x1). As described above, the cross fade which is added at the time of switching from the image img_301 to the image img_302 is determined so that the luminance change rate in the cross-fade period (x1) becomes the second threshold or less. Thus, a strong visual stimulus to the viewer at the time of switching from the image img_301 to the image img_302 can be suppressed.

Next, at the time of display switching from the image img_302 to the image img_303, normal display is performed. As a result, as shown in FIG. 4, the display luminance at the time of switching from the display period (b) of the image img_302 to the display period (c) of the image img_303 changes like step function as shown by the solid line. The change amount of luminance at the time of the image switching is much smaller than that at the time of the image switching from the image img_301 to the image img_302. Therefore, at the time of switching from the image img_302 to the image img_303, without adding the cross-fade, a strong visual stimulus to the viewer can be suppressed. As described above, when the luminance change between two images to be switched is less than the threshold Yth_cf, the cross-fade period is not inserted at the time of image switching, so that the time required for the image switching can be prevented from becoming unnecessarily long.

Also at the time of switching from the image img_303 to the image img_304, the image process of cross-fade is performed. As a result, in FIG. 4, the cross-fade period (x2) is inserted between the display period (c) of the image img_303 and the display period (d) of the image img_304, and the display luminance in the cross-fade period (x2) gradually decreases as shown by the solid line.

As described above, the image display apparatus according to the embodiment has obtaining means (the luminance extraction unit 103) which obtains the characteristic value (average picture level) indicative of luminance of each image in image display of continuously displaying a plurality of images while sequentially switching the images. There is a period of switching images according to the difference (the difference Y_sub of average luminance levels) of the characteristic values output from the obtaining means, and an image process of adding the transition effect (cross-fade) of decreasing the display luminance change rate in the switching period is performed. Specifically, in the embodiment, when the luminance difference Y_sub is equal to or larger than the threshold Yth_cf, the image process of adding cross-fade to the switching of images is executed. By the process, even when the luminance values of the two images are largely different from each other, the display luminance can change gently in the period of switching the two images. Therefore, a strong visual stimulus to a viewer can be suppressed at the time of switching of images. When the luminance difference Y_sub is smaller than the threshold Yth_cf, the image process of adding cross-fade is not performed, but the normal switching is carried out. Therefore, the time required for the image switching can be prevented from becoming unnecessarily long. As described above, the image display apparatus according to the embodiment adds the adaptive transition effect to the luminance difference of two images to switching of the two images, so that it can preferably realize both suppression of a strong visual stimulus to a viewer and light continuous image reproduction.

Second Embodiment

Next, a second embodiment of the present invention will be described using FIG. 1. As stated in the description of FIG. 1 in the first embodiment, the reference numerals 500 to 503 in parentheses and an illuminance sensor 501 drawn by a broken line in FIG. 1 are components of the image display apparatus 500 according to the second embodiment. Since the reference numerals 101 to 106 and 109 are components common to the first and second embodiments and have functions similar to those described in the first embodiment, their description will not be described. The image display apparatus 500 shown in FIG. 1 includes the illuminance sensor 501 for measuring illuminance in a mounting place of the image display apparatus 500. The illuminance sensor 501 outputs the measured illuminance to the system controller 502 which will be described below. The illuminance sensor 501 of the embodiment corresponds to the illuminance obtaining unit in the present invention. The system controller 502 controls the blocks of the image display apparatus 500 including the blocks described in the first embodiment and the illuminance sensor 501 in a centralized manner. The memory 503 stores a threshold table corresponding to illuminance measured by the illuminance sensor 501 and is connected to the system controller 502.

(Description on Image Displaying Operation of Image Display Apparatus 500)

Figure 5:
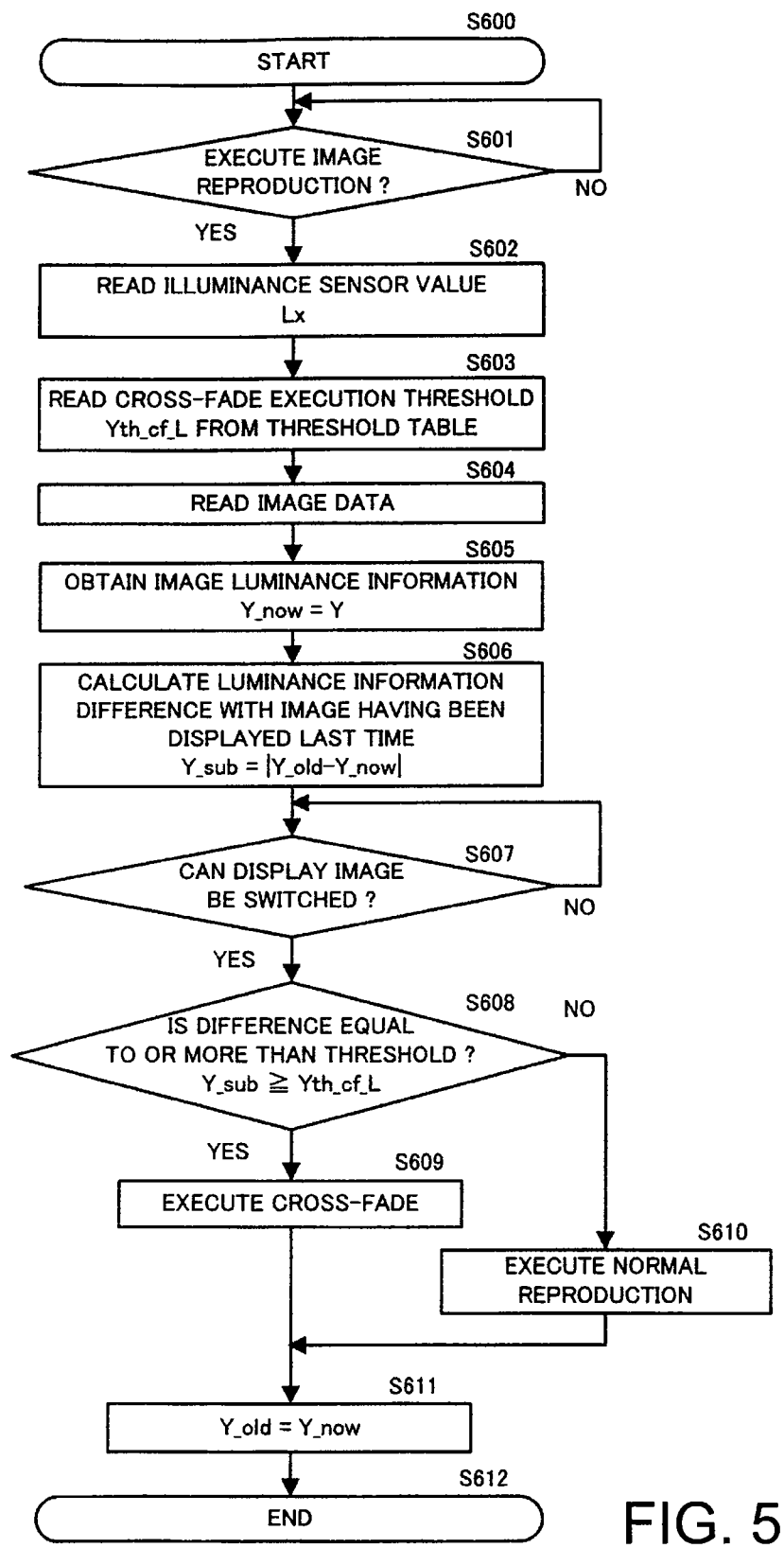
FIG. 5 is a flowchart showing the operations of the system controller of a second embodiment.

Next, the operation of the image display apparatus 500 according to the invention will be described using the flowchart of FIG. 5. The flowchart of FIG. 5 is executed by controlling the blocks by the system controller 502 in FIG. 1.

First, when execution of image reproduction is instructed by an operation from the operation unit 109 in a process of step S601, the system controller 502 moves to step S602, and reads illuminance Lx from the illuminance sensor 501.

Figure 6:
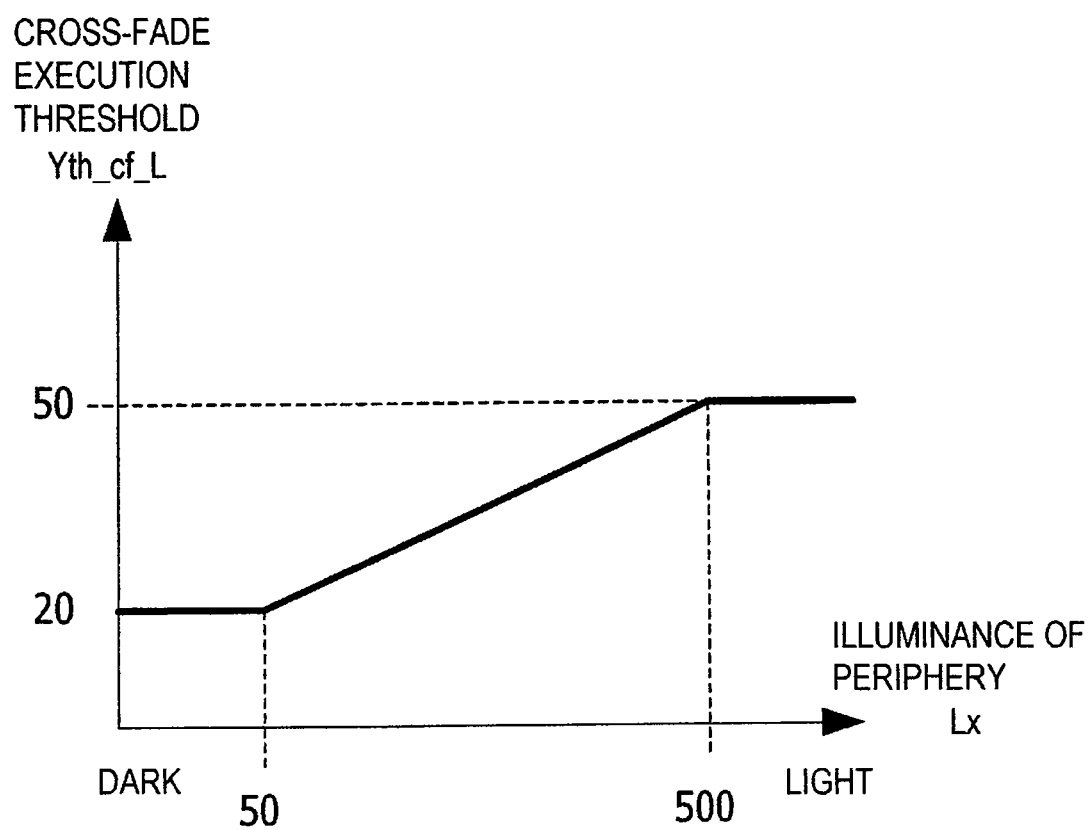
FIG. 6 is a diagram showing the relation between surrounding illuminance and cross-fade execution threshold in the second embodiment.

Next, the system controller 502 moves to step S603 and performs a process of reading a cross-fade execution threshold Yth_cf_L corresponding to the illuminance Lx. FIG. 6 shows an example of a threshold table indicating the relation between the illuminance Lx and the cross-fade execution threshold Yth_cf_L. As shown in FIG. 6, as the illuminance Lx increases, the larger the cross-fade execution threshold Yth_cf_L becomes. In the example of FIG. 6, the cross-fade execution threshold Yth_cf_L changes between 20 to 50, according to the illuminance Lx. When the illuminance Lx is 50 or less, the cross-fade execution threshold is constant at 20. When the illuminance Lx is 500 or larger, the cross-fade execution threshold is constant at 50. In the process of step S603, the cross-fade execution threshold Yth_cf_L corresponding to the illuminance Lx is read from the threshold table defined as described above.

After that, processes similar to those in the flow described with reference to FIG. 2 of the first embodiment are performed. The process characteristic to the second embodiment in the flow after step S603 is the process in step S608 using the cross-fade execution threshold Yth_cf_L which is read in the process of step S603 as a threshold compared with the luminance difference Y_sub. By controlling the image switching display according to the flow shown in FIG. 5, when the place where the image display apparatus 500 is mounted is dark and the illuminance is low, the cross-fade execution threshold Yth_cf_L becomes small. For example, when the mounting place of the image display apparatus 500 is very dark and the illuminance Lx is 50 or less, in the table of FIG. 6, the cross-fade execution threshold Yth_cf_L is set to "20". As a result, even when the luminance difference Y_sub of two images is a relatively small value (20 to 30) at which the cross-fade process is not performed in the first embodiment, by the control of the second embodiment, the cross-fade process is executed.

When the place where the image display apparatus 500 is mounted is light and illuminance thereof is high, the cross-fade execution threshold Yth_cf_L becomes large. For example, when the mounting place of the image display apparatus 500 is very light and the illuminance Lx is 500 or higher, in the table of FIG. 6, the cross-fade execution threshold Yth_cf_L is set to "50". As a result, even when the luminance difference Y_sub of two images is a relatively large value (30 to 50) at which the cross-fade process is performed in the first embodiment, by the control of the second embodiment, the cross-fade process is not executed. That is, only when the luminance difference between two images switched is considerably large, the cross-fade process is executed.

The threshold table of FIG. 6 is set in consideration of the tendency that the darker the viewing environment becomes, the stronger the visual stimulus the viewer feels becomes to a change in the luminance of two images which are being switched. That is, the higher the illuminance obtained by the illuminance sensor 501 becomes, the larger the cross-fade execution threshold Yth_cf_L is set. As shown by the example of the threshold table of FIG. 6, in a region where illuminance is high to a certain degree and a region where illuminance is low to a certain degree, the cross-fade execution threshold Yth_cf_L may be set to a constant value for the illuminance. By setting the cross-fade execution threshold Yth_cf_L to a variable value according to the illuminance, the cross-fade process can be easily performed in a viewing environment which is rather dark in which the viewer becomes more sensitive to a luminance change. In the image display apparatus according to the embodiment, to switching of two images, the transition effect adaptive to not only the luminance difference of the two images but also the illuminance of the viewing environment is added. Therefore, the viewer's experience of viewing continuous display images of can be improved.

Description of Threshold Table Corresponding to Other Illuminance

There is a case that the image display apparatus has a function of changing a setting of the display quality of an image (a display parameter such as brightness, hue, saturation, sharpness, and contrast). The image display apparatus has, as the name of a picture quality mode or the like, collection of setting values of parameters used for a process of changing at least one of display quality settings adapted to various source images, and has a function capable of switching the plurality of picture quality modes. The picture quality modes include, for example, a cinema mode adapted to the case of displaying a movie, a standard mode adapted to the case of displaying news or the like, and a dynamic mode adapted to the case of displaying sports and a music program. In the case of applying the embodiment to an image display apparatus having such a function of changing the picture quality mode, in the block diagram of FIG. 1, the apparatus further includes setting obtaining means (not shown) which obtains a display picture quality setting (the picture quality mode) selected in the image display apparatus. The threshold table for determining the cross-fade execution threshold Yth_cf_L according to the illuminance Lx may be variably set according to the obtained picture quality mode.

Figure 7:
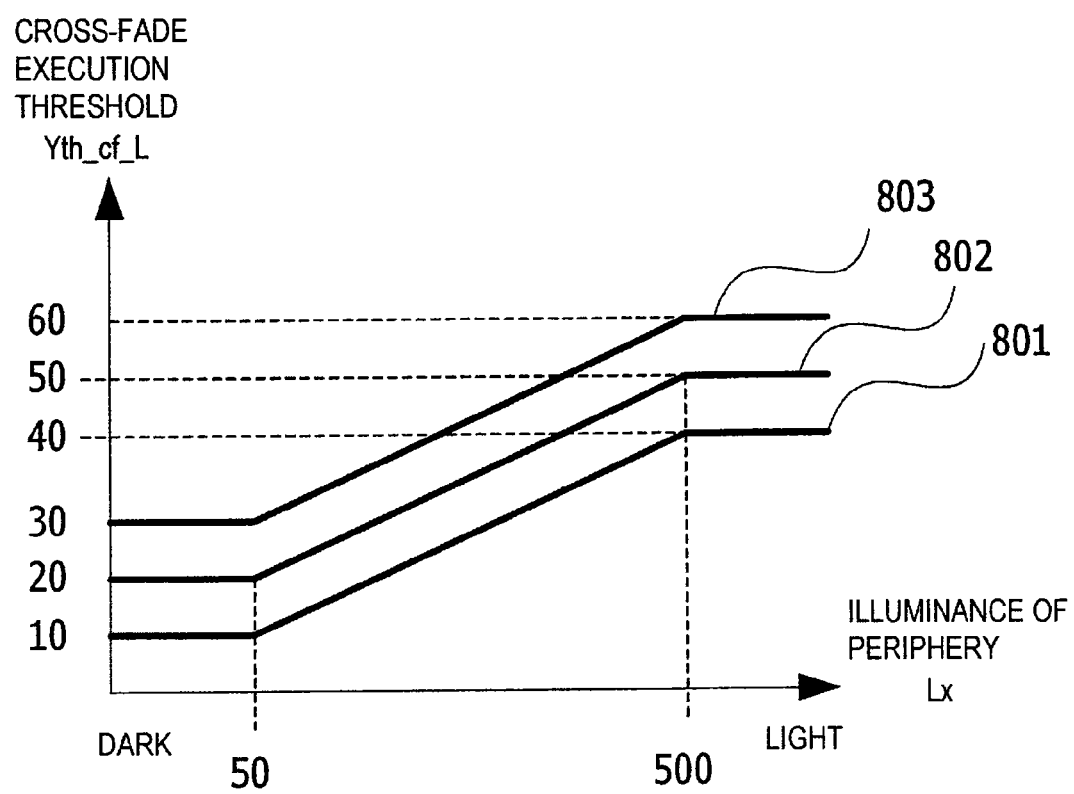
FIG. 7 is a diagram showing the relation between illuminance by picture quality modes and the cross-fade execution threshold in the second embodiment.

FIG. 7 is a diagram showing an example of the relations between the illuminance Lx determined so as to be varied according to the picture quality modes and the cross-fade execution threshold Yth_cf_L. Solid line 801 in FIG. 7 indicates a relation between the illuminance Lx and the cross-fade execution threshold Yth_cf_L in the case where a cinema mode is selected. Similarly, solid line 802 indicates a relation in the case where a standard mode is selected. Solid line 803 indicates a relation in the case where a dynamic mode is selected. In the example shown in FIG. 7, the value of the cross-fade execution threshold Yth_cf_L corresponding to the illuminance Lx has a characteristic that the value becomes larger in order of the cinema mode, the standard mode, and the dynamic mode. The relation between the illuminance Lx and the cross-fade execution threshold Yth_cf_L is provided for each picture quality mode, and a picture quality mode which is presently selected in the image display apparatus is obtained. Further, by making the relation between the illuminance Lx and the cross-fade execution threshold Yth_cf vary according to the picture quality modes, optimum image switching controls according to the picture quality modes can be performed. For example, in the cinema mode, even when the luminance difference of two images to be switched is a small value at which the cross-fade process is not performed in the other picture quality modes, the cross-fade process can be allowed to be executed. Consequently, the cross-fade process can be executed more easily at the time of switching of images, so that a visual stimulus given to the viewer at the time of switching the images is further reduced, and images can be displayed while switching them in relaxed atmosphere. On the other hand, in the dynamic mode, even when the luminance difference between two images to be switched is a large value at which the cross-fade process is performed in the other picture quality modes, the cross-face process can be inhibited. Consequently, simple display switching is often performed at the time of image switching. As a result, images can be switched in dynamic atmosphere.

Not only in the second embodiment but also in the configuration of the first embodiment, the cross-fade execution threshold Yth_cf can be varied according to the picture quality mode. For example, by setting the cross-fade execution threshold, for example, Yth_cf=20 in the cinema mode, Yth_cf=30 in the standard mode, and Yth_cf=40 in the dynamic mode, in a manner similar to the above, the optimum cross-fade process according to the picture quality mode can be performed.

In the cinema mode, brightness of the screen display is generally suppressed more than in the other modes. Consequently, it is considered that even when the luminance difference between two images to be switched is large, the luminance difference is not felt so large at a stage where an image is displayed on the image display apparatus and, therefore, a viewer does not feel a strong visual stimulus. On the other hand, in the dynamic mode, brightness and contrast of the screen display are set to be higher than those in the other modes. Due to this, it is considered that even when the luminance difference between two images to be switched is not so large, the luminance difference is felt large at the stage where the images are displayed on the image display apparatus and, therefore, a viewer tends to feel a strong visual stimulus. Thus, opposite to the example shown in FIG. 7, the cross-fade execution threshold Yth_cf_L corresponding to the same illuminance Lx may have a characteristic that it decreases in order of the cinema mode, the standard mode, and the dynamic mode.

Third Embodiment

Next, a third embodiment of the present invention will be described. Since the configuration of an image display apparatus in the third embodiment is similar to that shown in FIG. 1 described in the first embodiment, the description will not be repeated. The embodiment is an example of applying the present invention on assumption of the case of performing automatic reproduction display of images called a slide show or play list reproduction and is a preferred example suitable for the case where images to be reproduced and displayed and the order can be predicted. In the forgoing first and second embodiments, an example of performing the image process of adding the cross-fade as the transition effect to switching of two images in continuous display based on the luminance difference between an image presently displayed and an image to be displayed next. In contrast, the third embodiment is characterized in the point that the system controller 107 controls the transition effect to be added to switching from an image being presently displayed to an image to be displayed next also based on the luminance of an image to be displayed after the image to be displayed next.

Specifically, when two images to be switched are set as first and second images in display order and the image next to the second image in display order is set as a third image, a first difference as the luminance difference between the first and second images and a second difference as the luminance difference between the second and third images are obtained. The transition effect which is added to switching from the first image to the second image is controlled according to the first and second differences. When the first embodiment is described in those terms, in the first embodiment, whether the cross-fade is added to the switching from the first image to the second image is determined according to whether the first difference is equal to or larger than the cross-fade execution threshold Yth_cf. The third embodiment is characterized in that, even if the first difference is less than the cross-fade execution threshold Yth_cf, depending on the value of the second difference, the cross-fade may be added to the switching from the first image to the second image.

To perform the control, the image reading unit 102 in the third embodiment refers to a table in which the order of performing a slide show is specified and data of a reproduction list related to reproduction of a play list. At the switching from an image (first image) being presently displayed to an image (second image) to be displayed next, the image reading unit 102 reads not only the image (second image) to be displayed next but also an image (third image) to be displayed next to the second image.

(Description on Image Displaying Operation in Third Embodiment)

Figure 8:
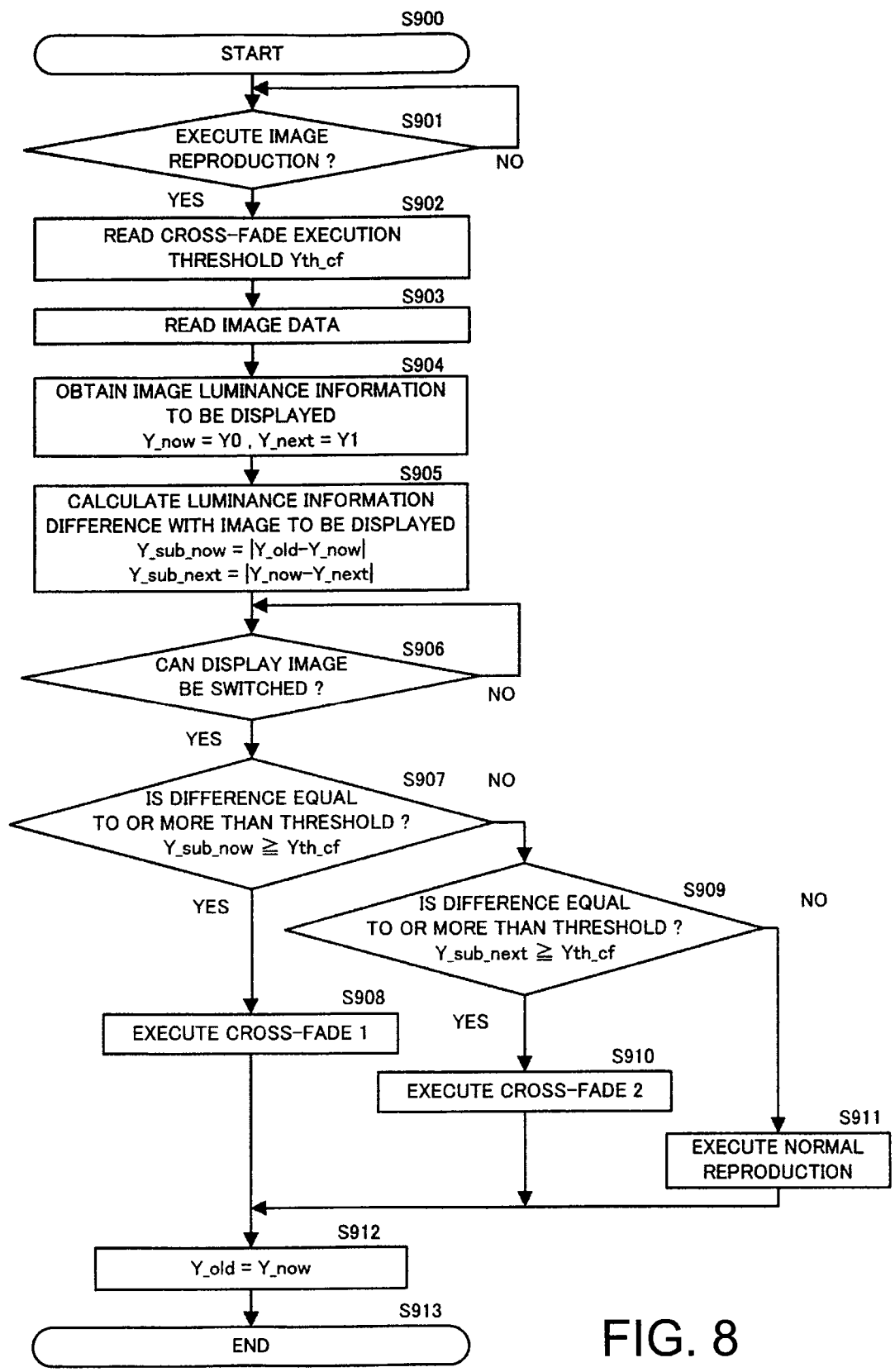
FIG. 8 is a flowchart showing the operations of a system controller of a third embodiment.

Next, the operation of the image display apparatus 100 in the third embodiment will be described using the flowchart of FIG. 8. The flowchart of FIG. 8 is executed by controlling the blocks by the system controller 107 in FIG. 1.

First, when execution of image reproduction is instructed by an operation from the operation unit 109 in a process of step S901, the system controller 107 moves to step S902, and reads the cross-fade execution threshold Yth_cf. In a manner similar to the second embodiment, it is possible to provide the illuminance sensor and set the cross-fade execution threshold Yth_cf as a variable value, or set the cross-fade execution threshold Yth_cf as a variable value according to a picture quality mode.

Next, the system controller 107 moves to step S903 and performs a process of reading an image from the storage medium 101. In this case, the system controller 107 refers to the table in which the order of performing a slide show is specified and data of a reproduction list related to reproduction of a play list and reads an image (second image) to be displayed next and an image (third image) to be displayed next to the second image.

The system controller 107 moves to the process in step S904, extracts an average picture level Y0 of the image (second image) to be displayed next, and stores it as the luminance Y_now of the image (second image) to be displayed next. Further, the system controller 107 extracts an average picture level Y1 of the image (third image) to be displayed next to the second image, and stores it as the luminance Y_next of the image (third image) to be displayed next to the second image. The case where the image (second image) to be displayed next is the last image in a slide show or a play list, that is, the case where the image (third image) to be displayed next to the second image does not exist will be described below.

The system controller 107 moves to the process in step S905, calculates the absolute value |Y_old−Y_now| of the difference (first difference) between the luminance Y_old of the image (first image) presently being displayed and the luminance Y_now of the image (second image) to be displayed next, and stores it as the luminance difference Y_sub_now of next time. Further, the system controller 107 calculates the absolute value |Y_now−Y_next| of the difference (second difference) between the luminance Y_now of the image (second image) to be displayed next and the luminance Y_next of the image (third image) to be displayed next to the second image, and stores it as the luminance difference Y_sub_next of this time.

The system controller 107 moves to the process in step S906 and performs a process of determining whether the displayed image can be switched based on an image switching detection signal from the image switching detection unit 104. When the displayed image can be switched, the system controller 107 moves to the process in step S907.

In the process in step S907, the luminance difference (first difference) Y_sub_now of this time and the cross-fade execution threshold Yth_cf are compared.

When it is determined in step S907, that the luminance difference (first difference) Y_sub_now of this time is equal to or larger than the cross-fade execution threshold Yth_cf (YES in step S907), the system controller 107 moves to the process in step S908. In the process in step S908, an image process of adding the transition effect of a cross-fade 1 to the switching from the image (first image) being presently displayed to the image (second image) to be displayed next is executed. The cross-fade 1 is a transition effect determined in a manner similar to the cross-fade described in the first embodiment. That is, a period of displaying an image obtained by combining the images A and B with a weight which gradually changes is inserted in the switching from the image A to the image B. The cross-fade 1 is determined so that the change rate of display luminance in the switching from the image A to the image B becomes equal to or less than the second threshold.

On the other hand, when it is determined in step S907 that the luminance difference (first difference) Y_sub_now of this time is less than the cross-fade execution threshold Yth_cf (NO in step S907), the system controller 107 moves to the process in step S909. In the process in step S909, the luminance difference (second difference) Y_sub_next of next time and the cross-fade execution threshold Yth_cf are compared.

When it is determined in step S909, that the luminance difference (second difference) Y_sub_next of next time is equal to or larger than the cross-fade execution threshold Yth_cf (YES in step S909), the system controller 107 moves to the process in step S910. In the process in step S910, an image process of adding the transition effect of the cross-fade 2 to the switching from the image (first image) being presently displayed to the image (second image) to be displayed next is executed. The cross-fade 2 corresponds to a process, in a manner similar to the cross-fade 1, in the case of displaying a new image B in place of an image A being displayed, of gradually increasing a weight on the image B for the image A with lapse of time to gradually change the display image from the image A to the image B. The differences between the process in the cross-fade 1 and the process in the cross-fade 2 are that the time of switching from the image A to the image B in the cross-fade 2 is shorter than that in the cross-fade 1, and there is no limitation in the change rate of display luminance in the cross-fade 2. The cross-fade 2 may be similar to the cross-fade 1.

When it is determined in step S909 that the luminance difference (second difference) Y_sub_next of next time is less than the cross-fade execution threshold Yth_cf (NO in step S909), the system controller 107 moves to the process in step S911. In the process in step S909, switching from an image being presently displayed to an image to be displayed next is performed in normal reproduction. That is, a process of simply switching images is executed.

When the image to be displayed next is the last image in the slide show or the play list, that is, when the image to be displayed after the next does not present, acquisition of Y_next in step S904 and calculation of Y_sub_next in step S905 are not performed. When it is determined YES in step S907, the system controller 107 moves to the process in step S908 and executes the cross-fade 1. When it is determined NO in step S907, the system controller 107 moves to the process in step S911 and executes the normal reproduction.

After completion of the process in step S908, S910 or S911, the system controller 107 moves to the process in step S912, stores the luminance Y_now as luminance Y_old in the memory 108, and finishes the process in step S913.

(Description of Concrete Display Example)

A concrete example of the case of displaying an image according to the flow of FIG. 8 will now be described. FIGS. 9A to 9D are examples of images which are slide-show reproduced and the reproduction order. By referring to not-shown play list data, the image reading unit 102 can recognize that four images shown in FIGS. 9A to 9D are to be automatically reproduced in the order of img_101, img_102, img_103, and img_104. In a manner similar to the first embodiment, in the third embodiment as well, the average picture levels APL of images are used as luminance of the images. The average picture level APL has a value from "0" to "100". The value of the average picture level APL of each image is extracted from each image by the luminance extraction unit 103 and output as luminance of the image to the system controller 107.

Figure 9A:
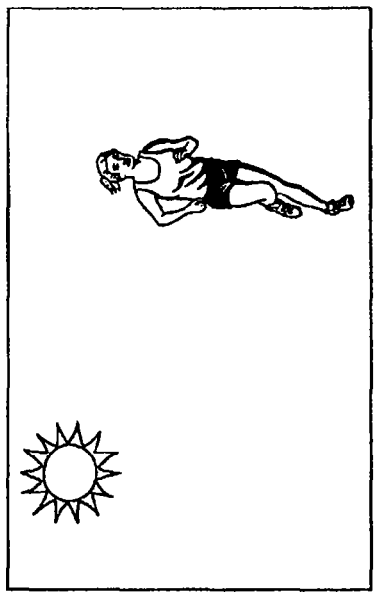
FIGS. 9A to 9D are diagrams showing input image examples of the third embodiment.
Figure 9B:
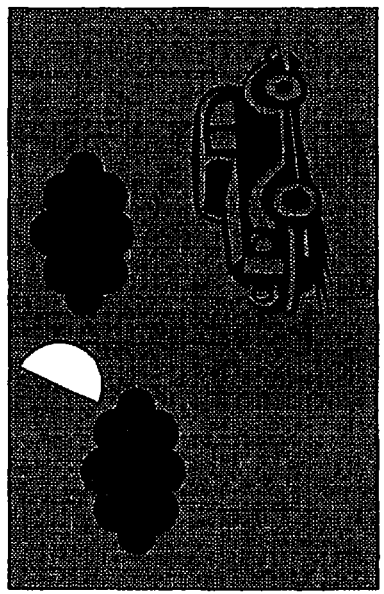
Figure 9C:
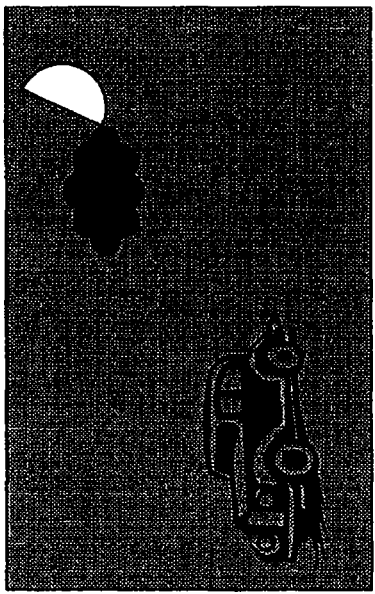
Figure 9D:
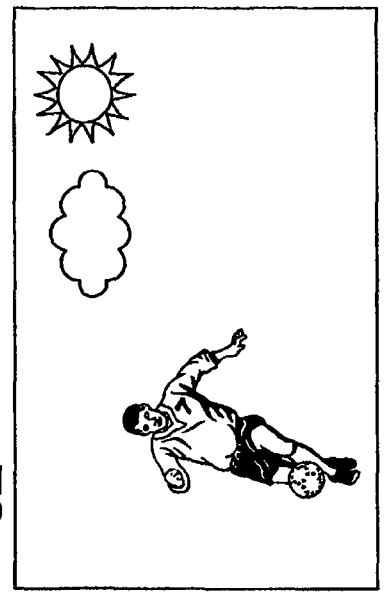

To simplify the description, the operation from a state where the image img_101 of FIG. 9A is read and displayed on the image display unit 106 will be described, that is, the state where the average picture level APL of the image img_101 is stored as the luminance Y_old of the image (first image) being presently displayed. In the example of FIG. 9, the average picture level APL of the image img_101 is "10", so that the luminance Y_old=10 of the image (first image) being presently displayed is stored. After displaying of the image img_101, when reproduction of the next image is instructed in step S901, the cross-fade execution threshold Yth_cf is read by the process in step S902. Also in the embodiment, description will be given on assumption that the cross-fade execution threshold Yth_cf=30. Next, in the process in step S903, the image img_102 as the image (the second image) to be displayed next and the image img_103 as an image (third image) to be displayed next to the second image are read. In the process in step S904, the average picture level Y0 of the image img_102 is extracted and stored as luminance Y_now of the image (second image) to be displayed next. Further, the average picture level Y1 of the image img_103 is extracted and stored as the luminance Y_next of the image (third image) to be displayed next to the second image. In the example of FIG. 9, the average picture level APL of the image img_102 is "30", and that of the image img_103 is "70". Therefore, the luminance Y_now=30 of the image (second image) to be displayed next and the luminance Y_next=70 of the image (third image) to be displayed next to the second image are stored.

In the process in step S905, the difference (first difference) between the luminance Y_old of the image (the first image) (img_101) being presently displayed and the luminance Y_now of the image (the second image) (img_102) to be displayed next is calculated and stored as the luminance difference Y_sub_now of this time. In this case, the luminance difference Y_sub_now of this time is equal to |Y_old−Y_now|=|10−30|=20. Further, the difference (second difference) between the luminance Y_now of the image (the second image) (img_102) to be displayed next and the luminance Y_next of the image (the third image) (img_103) to be displayed next to the second image is calculated and stored as the luminance difference Y_sub_next of next time. In this case, the luminance difference Y_sub_next of next time is equal to |Y_now−Y_next|=|30−70|=40.

When it is determined in the process of step S906 that the display image can be switched to the image img_102, the system controller 107 moves to step S907.

In the process of step S907, the system controller 107 compares the luminance difference Y_sub_now of this time with the cross-fade execution threshold Yth_cf. In the example of FIG. 9, the luminance difference Y_sub_now of this time is 20 and the cross-fade execution threshold Yth_cf is 30, and Y_sub_now≥Yth_cf is not satisfied, so that the system controller 107 moves to the process in step S909.

In the process of step S909, the system controller 107 compares the luminance difference Y_sub_next of next time with the cross-fade execution threshold Yth_cf. In the example of FIG. 9, the luminance difference Y_sub_next of next time is 40 and the cross-fade execution threshold Yth_cf is 30, and Y_sub_next≥Yth_cf is satisfied, so that the system controller 107 moves to the process in step S910.

In the process of step S910, an image process of adding the transition effect of the cross-fade 2 to the switching from the image img_101 in the image img_102 is executed.

After that, the system controller 107 moves to the process in step S912, stores the value "30" of the luminance Y_now (the luminance of the image img_102) as the value of the luminance Y_old to the memory 108, and finishes the process.

Hereinafter, also when the display is sequentially switched from the image img_103 to the image img_104, the above flow is repeated. At the time of switching from the image img_102 to the image img_103, the average picture level APL of the image img_102 is "30", and the average picture level APL of the image img_103 is "70". Therefore, the luminance Y_old of the image (first image) (img_102) being presently displayed is 30, and the luminance Y_now of the image (second image) (img_103) to be displayed next is 70. Therefore, the luminance difference Y_sub_now of this time is equal to |30−70|=40, and Yth_cf=30, so that Y_sub_now Yth_cf is satisfied in step S907. The system controller 107 moves to the process in step S908, and adds the cross-fade 1 to the switching from the first image (img_102) to the second image (img_103). Hereinafter, similarly, the luminance difference (first difference) between the image (first image) being presently displayed and the image (second image) to be displayed next and the luminance difference (second difference) between the image (second image) to be displayed next and the image (third image) to be displayed next to the second image are obtained. The transition effect to be added to the switching from the image (first image) being presently displayed and the image (second image) to be displayed next is determined according to the first and second differences.

Figure 10:
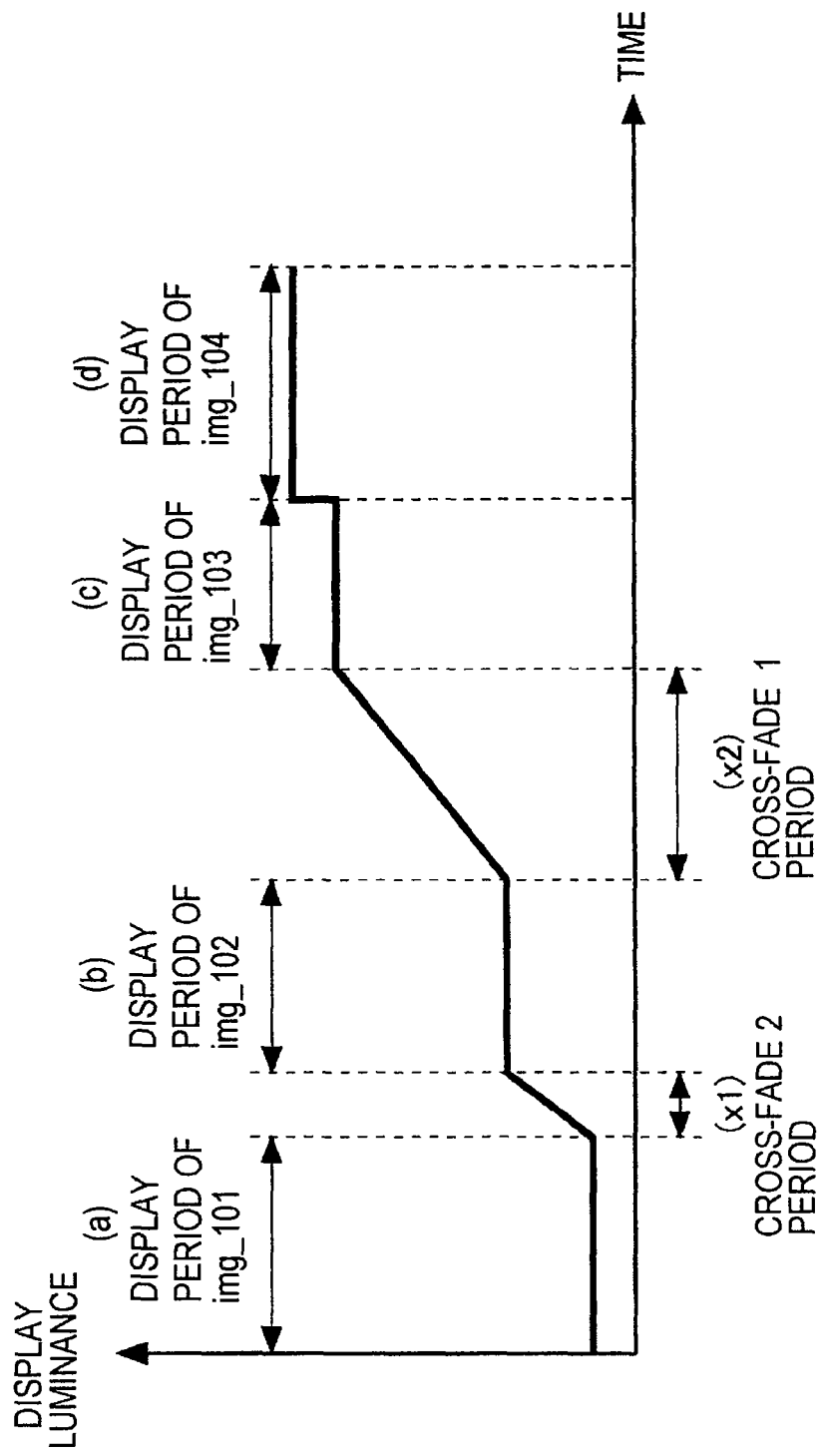
FIG. 10 is a diagram showing a change in image display luminance of the third embodiment.

FIG. 10 is a diagram showing the relations between lapse time and changes in display luminance of the case of performing sequential switching display of a plurality of images is performed in a slide show reproduction by the image switching control. Alphabets (a) to (d) in FIG. 10 indicate periods of displaying only the images img_101 to img_104, respectively, on the image display unit 106. Reference numerals (x1) and (x2) in FIG. 10 indicate the cross-fade period inserted at the time of switching from the image img_101 to the image img_102 and the cross-fade period inserted at the time of switching from the image img_102 to the image img_103, respectively. The solid line of FIG. 10 shows changes in the display luminance within each of the periods.

As described above, at the time of display switching from the image img_101 to the image img_102, the image process of adding the transition effect of the cross-fade 2 is performed. That is, the cross-fade 2 period (x1) is inserted between the display period (a) of the image img_101 and the display period (b) of the image img_102. Within the cross-fade 2 period (x1), the images img_101 and img_102 are combined with a weight which changes gradually, and the composite image is displayed. Therefore, the display luminance of the image obtained by combining the two images and displayed, that is, the image to which the cross-fade 2 is added gradually changes as shown by the solid line in the cross-fade period (x1) in FIG. 10 in shorter time as compared with the cross-fade 1 period (x2).

At the time of display switching from the image img_102 to the image img_103, the image process of adding the transition effect of the cross-fade 1 is performed. That is, the cross-fade 1 period (x2) is inserted between the display period (b) of the image img_102 and the display period (c) of the image img_103. In the cross-fade 1 period (x2), the images img_102 and img_103 are combined with a weight which changes gradually, and the composite image is displayed. Therefore, the display luminance of the image obtained by combining the two images and displayed, that is, the image to which the cross-fade 1 is added also gradually changes as shown by the solid line within the cross-fade period (x2) in FIG. 10. At the time of display switching from the next image img_103 to the image img_104, normal reproduction is performed for the reason that the luminance difference between the images img_103 and img_104 is less than the cross-fade execution threshold Yth_cf and no image to be displayed next to the image img_104 presents.

As described above, with the configuration of the image display apparatus and the image switching control of the embodiment, the transition effect to be added to the switching of images can be controlled based on specified order information for automatically switching-displaying a plurality of images. That is, the luminance difference of images which are successive in the display order can be calculated not only for two images to be switched next but also two images to be switched in future. The transition effect which is added to switching of two images to be switched next can be controlled in consideration of also the luminance difference of two images to be switched in future. In the embodiment, the luminance difference (first difference) between two images (first and second images) to be switched next and the luminance difference (second difference) of two images (second and third images) to be switched after the next are calculated. Based on the two luminance differences, the transition effect to be added to the switching of two images (first and second images) to be switched is controlled.

As a result, the cross-fade is not added only to the switching between images having a large luminance difference but weak cross-fade can be added also to the switching of images performed before that. Therefore, image switching to which the cross-fade is added is not performed unexpectedly but image switching to which the cross-fade is added is performed twice in a row. Thus, in the automatic successive display of a plurality of images, the experience of viewing continuous images in the smooth flow can be provided to the viewer.

Modifications

The "image" in the foregoing embodiments may be a still image or a moving image. In the case of continuously displaying a plurality of images while sequentially switching them, the luminance is extracted from a moving image. According to a result of comparison between the luminance difference of moving images which are continuous in the display order and the threshold, the transition effect of decreasing the display luminance change rate can be added to the display switching of the moving images. By performing such image process, the effect of suppressing a strong visual stimulus to the viewer can be expected also at the time of switching of moving images.

Although the average picture level APL is exemplified as luminance of an image in the foregoing embodiments, any characteristic value indicative of luminance (brightness) of an image may be used. For example, the maximum luminance level (peak luminance) in an image, an intermediate value, a mode value, or the like may be employed. A characteristic value indicative of luminance of an image may be obtained from an entire image or only a part (for example, a center part) of an image.

Although the cross-fade is exemplified as the transition effect of decreasing the display luminance change rate at the switching of images in the foregoing embodiments, similarly, an image process of adding a transition effect such as wipe or scroll of combining two successive images which can be switched and displaying the composite image may be employed. Not the transition effect of combining two images like the cross-fade but an image process of adding a luminance correction effect of simply suppressing luminance of an image to be displayed next may be used.

The image process of adding the adaptive transition effect according to the luminance difference between two images to be switched is not limited to an image process which is performed in a real-time manner at the time of actually displaying the image to the image display unit like in the foregoing embodiments. For example, in image editing software of automatically generating a slide show work of sequentially reproducing a plurality of images which are entered, an effect function of adaptively adding a transition effect to switching of images in the slide show work may be employed.

The present invention can be applied to the case where the blocks of the display apparatus of the invention are realized by hardware and also the case where the blocks of the display apparatus are realized by a software process using a computer, and similar effects can be obtained. In the case of realizing the blocks by the software process, the program code itself of the software realizes the function of the embodiments. The present invention includes the program code itself, means for supplying the program code to a computer and, for example, a storage medium storing the program code. As the storage medium storing the program code, for example, a hard disk, an optical disk, a magnetooptic disk, a CD-ROM, a magnetic tape, a nonvolatile memory card, a ROM, or the like can be used.

Also when the functions described in the foregoing embodiments are realized when the supplied program code cooperates with an OS working on a computer, another application software, or the like, the program code is included in the embodiment of the present invention. Further, the supplied program code may be stored in a function extension board of a computer or a memory provided for a function extension unit connected to the computer. The present invention also includes the case where a CPU or the like provided for the function extension board or the function extension unit performs a part or all of actual process based on an instruction of the program code, and the functions of the foregoing embodiments are realized by the process.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-181834, filed on Aug. 4, 2009, which is hereby incorporated by reference herein in its entirety.

What is claimed is:

1. An image processing apparatus having a slide show function of displaying a plurality of images on a display unit while sequentially automatically switching the images, comprising:
    an adding unit, when switching display from a first image being displayed on the display unit to a second image to be displayed next to the first image, of adding a first predetermined transition effect which gradually changes a displayed image from the first image to the second image;
    an obtaining unit which obtains characteristic values indicative of luminance of the first and second images displayed on the display unit;
    a determining unit which determines whether difference between a characteristic value of the first image and a characteristic value of the second image obtained by the obtaining unit is equal to or larger than a predetermined threshold; and
    a control unit which controls the adding unit so that:
    in a case where the determining unit determines that the difference is equal to or larger than the predetermined threshold, the first predetermined transition effect is added when switching display from the first image to the second image, and
    in a case where the determining unit determines that the difference is less than the predetermined threshold;
        the first predetermined transition effect is not added when switching display from the first image to the second image,
        in a case where the determining unit determines that difference between the characteristic value of the second image and a characteristic value of a third image to be displayed after the second image is equal to or larger than the predetermined threshold, even if the determining unit determines that the difference between the characteristic value of the first image and the characteristic value of the second image is less than the predetermined threshold, when switching display from the first image to the second image, the control unit controls the adding unit to add a second predetermined transition effect so that the second image is displayed gradually from the first image, and
        in a case where the determining unit determines that the difference between the characteristic value of the second image and the characteristic value of the third image is less than the predetermined threshold and that the difference between the characteristic value of the first image and the characteristic value of the second image is less than the predetermined threshold, neither the first predetermined transition effect nor the second predetermined transition effect is added when switching display from the first image to the second image.

2. The image processing apparatus according to claim 1, wherein the control unit determines a transition period to display the second image gradually from the first image so that a luminance change rate per unit time caused by a change of display from the first image to the second image becomes equal to or less than a predetermined luminance change rate per unit time.

3. The image processing apparatus according to claim 1, further comprising
    an illuminance obtaining unit which obtains illuminance of periphery of the display unit,
    wherein the determining unit increases the predetermined threshold as the illuminance obtained by the illuminance obtaining unit becomes higher.

4. The image processing apparatus according to claim 3, further comprising
    a picture quality information obtaining unit which obtains display picture quality setting information of the display unit,
    wherein the determining unit changes the predetermined threshold according to the display picture quality setting information obtained by the picture quality information obtaining unit.

5. The image processing apparatus according to claim 4, wherein the display picture quality setting information is information indicating at least one of brightness, hue, saturation, sharpness, and contrast of an image to be displayed on the display unit.

6. The image processing apparatus according to claim 1, wherein the characteristic value is an average luminance value or a maximum brightness value of a plurality of pixels forming an image.

7. The image processing apparatus according to claim 1, wherein the transition effect is cross-fade, wipe, or scroll.

8. A method for controlling an image processing apparatus having a slide show function of displaying a plurality of images on a display unit while sequentially automatically switching the images, comprising:
    an adding step, when switching display from a first image being displayed on the display unit to a second image to be displayed next to the first image, of adding a first predetermined transition effect which gradually changes a displayed image from the first image to the second image;
    an obtaining step of obtaining characteristic values indicative of luminance of the first and second images displayed on the display unit;
    a determining step of determining whether difference between a characteristic value of the first image and a characteristic value of the second image obtained by the obtaining unit is equal to or larger than a predetermined threshold; and
    a control step of controlling the adding step so that:
    in a case where it is determined in the determining step that the difference is equal to or larger than the predetermined threshold, the first predetermined transition effect is added when switching display from the first image to the second image, and
    in a case where it is determined in the determining step that the difference is less than the predetermined threshold:

the first predetermined transition effect is not added when switching display from the first image to the second image, in a case where it is determined in the determining step that difference between the characteristic value of the second image and a characteristic value of a third image to be displayed after the second image is equal to or larger than the predetermined threshold, even if it is determined in the determining step that the difference between the characteristic value of the first image and the characteristic value of the second image is less than the predetermined threshold, when switching display from the first image to the second image, the adding step is controlled to add a second predetermined transition effect so that the second image is displayed gradually from the first image, and in a case where is determined in the determining step that the difference between the characteristic value of the second image and the characteristic value of the third image is less than the predetermined threshold and that the difference between the characteristic value of the first image and the characteristic value of the second image is less than the predetermined threshold, neither the first predetermined transition effect nor the second predetermined transition effect is added when switching display from the first image to the second image.

9. The method for controlling an image processing apparatus according to claim 8,
wherein in the controlling step, a transition period to display the second image gradually from the first image is determined so that a luminance change rate per unit time caused by a change of display from the first image to the second image becomes equal to or less than a predetermined luminance change rate per unit time.

10. The method for controlling an image processing apparatus according to claim 8, further comprising
an illuminance obtaining step of obtaining illuminance of periphery of the display unit,
wherein in the determining step, the predetermined threshold is increased as the illuminance obtained in the illuminance obtaining step becomes higher.

11. The method for controlling an image processing apparatus according to claim 10, further comprising
a picture quality information obtaining step of obtaining display picture quality setting information of the display unit,
wherein in the determining step, the predetermined threshold is changed according to the display picture quality setting information obtained in the picture quality information obtaining step.

12. The method for controlling an image processing apparatus according to claim 11,
wherein the display picture quality setting information is information indicating at least one of brightness, hue, saturation, sharpness, and contrast of an image to be displayed on the display unit.

13. The method for controlling an image processing apparatus according to claim 8,
wherein the characteristic value is an average luminance value or a maximum brightness value of a plurality of pixels forming an image.

14. The method for controlling an image processing apparatus according to claim 8,
wherein the transition effect is cross-fade, wipe, or scroll.

* * * * *